(12) United States Patent
Williams (10) Patent No.: US 7,407,170 B1
(45) Date of Patent: Aug. 5, 2008

(54) WIRE SHORT-NOSED WALKING AID WITH SEAT AND METHOD

(76) Inventor: Ann Williams, 9679 S. Merrion Ave., Chicago, IL (US) 60617

( * ) Notice: Subject to any disclaimer, the term of this patent is extended or adjusted under 35 U.S.C. 154(b) by 190 days.

(21) Appl. No.: 11/509,277

(22) Filed: Aug. 24, 2006

(51) Int. Cl.
*B62B 3/10* (2006.01)

(52) U.S. Cl. ............................ 280/33.996; 280/33.991; 280/47.18; 280/401; 280/402; 280/639

(58) Field of Classification Search ............ 280/33.996, 280/33.991, 47.18, 401, 402, 639, 47.34
See application file for complete search history.

(56) References Cited

U.S. PATENT DOCUMENTS

| | | | | |
|---|---|---|---|---|
| 2,615,726 | A | * | 10/1952 | Brottman .................. 280/47.35 |
| 3,170,709 | A | * | 2/1965 | Shackel .................... 280/47.34 |
| 4,345,790 | A | | 8/1982 | Coe |
| 4,415,198 | A | | 11/1983 | Brearley |
| 4,532,948 | A | | 8/1985 | Burrows |
| D298,816 | S | | 12/1988 | Burkhart et al. |
| 4,907,839 | A | | 3/1990 | Rose et al. |
| 4,974,620 | A | | 12/1990 | Quillan et al. |

(Continued)

OTHER PUBLICATIONS

"The Walking Aid Store" Internet webpage at www.spinlife.com/category.cfm?categoryID=73&adv=googleads&tar, 3 pages, accessed May 16, 2006.
Commercial shopping cart of unknown brand, in use in the Chicago area in May of 2006 or earlier, photographic prints of which on Exhibit A sheet.

(Continued)

*Primary Examiner*—Christopher P. Ellis
*Assistant Examiner*—Cynthia Collado
(74) *Attorney, Agent, or Firm*—Joan I. Norek; Law Office of Joan I. Norek (57) ABSTRACT

A short-nosed wheeled walking aid has (a) a substantially horizontal base member having a front perimeter, a rear perimeter, a right perimeter and a left perimeter; (b) a front wheel assembly mounted to and supporting the base member adjacent the front perimeter, (c) a rear wheel assembly mounted to and supporting the base member adjacent the rear perimeter, (d) at least three upright right panels mounted on the base member, (e) a hand grip spaced behind and substantially parallel to the upright rear panel having a ground height (height off the ground, measured from the plane on which the wheels rest) of from about thirty to about forty inches, and (f) a seat assembly mounted to the exterior side of the rear panel, the seat assembly including a seat member translatable from a substantially vertical posture substantially parallel to the rear panel to a substantially horizontal posture substantially normal to the rear panel.

A method of assisting the ambulation of a person employs the wheeled walking aid. The method comprises the steps of (1) with the seat assembly in the upright posture, grasping the walking aid at the hand grip and walking forward while pushing the walking aid ahead in forward motion, (2) then halting the forward walking while continuing to grasp the hand grip to arrest the forward motion of the walking aid, (3) then translating the seat member to from the substantially upright posture to the substantially horizontal posture substantially normal to the basket body, (4) then resting by sitting on the seat member; and (5) then translating the seat member to from the substantially horizontal posture back to the substantially upright posture, and grasping the walking aid at the hand grip with the two hands and walking forward while pushing the walking aid ahead in forward motion.

8 Claims, 5 Drawing Sheets

U.S. PATENT DOCUMENTS

| | | |
|---|---|---|
| 4,974,760 A | 12/1990 | Miller |
| D331,209 S | 11/1992 | Short et al. |
| 5,224,721 A | 7/1993 | Santmann |
| 5,280,800 A | 1/1994 | Pirrallo |
| 5,353,824 A | 10/1994 | Woods et al. |
| D363,589 S * | 10/1995 | Lafleur et al. ............... D34/21 |
| 5,547,205 A * | 8/1996 | do Rosario Sousa de Cabedo .................. 280/30 |
| 5,605,169 A | 2/1997 | Light |
| D457,111 S | 5/2002 | Galleguillos |
| 6,651,994 B2 | 11/2003 | Hallgrimsson et al. |
| 6,746,079 B2 * | 6/2004 | Cabedo-Deslierres .... 297/250.1 |
| 6,921,101 B1 | 7/2005 | Lauren et al. |

\* cited by examiner

WIRE SHORT-NOSED WALKING AID WITH SEAT AND METHOD

BACKGROUND OF THE INVENTION

The present invention relates to walking aids, which are generally known as walkers or ambulatory aids.

Standard or conventional non-wheeled four-legged invalid walkers typically are comprised of a pair of opposed, tubular inverted—and somewhat splayed U-shaped side frames or supports joined by one or more front crossbars. The user is normally positioned at least somewhat between the opposed side frames, and grips the forward sections of the upper horizontal bars of the side members, using the walker for side-to-side balance and support. Commonly the user rests his or her forearms on the upper horizontal bars for support. Such standard walkers require manual lifting and forward-positioning by the user for forward step-by-step walking purposes. As noted, the user is so positioned regarding the walker that the walker acts as a surround, partially encircling the user, while the user is poised in a forwardly-bent or hunched position, substantially or at least partially flanked by the side frames and their upper horizontal bars.

Wheeled walkers are also known. A wheeled walker typically has a frame mounted on four wheels and a pair of rearwardly extending handle bars which the user can grip for support while walking. The user positions himself or herself between the handle bars behind the core frame and pushes the walker forward. A wheeled walker eliminates the manual lifting required of a standard four-legged walker. The handle bars of a typical wheeled walker overlay the wheel base, or in other words, the rearmost extent of the handle bars is short of the rearmost extent of the rear wheels. A user, standing between the handle bars and gripping the handle bars, is still provided with a surround, the wheeled walker partially encircling the user and providing side-to-side balance assistance and weight support.

Some invalid walkers with carrier baskets and with seating platforms are also known.

Known outside of the invalid-walker field are personal shopping carts. Such carts typically have two opposed wheels and a transverse or crossways handle or hand grip. Such carts are conventionally used by dragging them behind the user, tilted up on the wheels, gripped by one hand of the user.

Known outside of the invalid-walker field are retail-store shopping carts, which are typically large baskets mounted on a four-wheeled frame with a following transverse or crossways hand grip. Such shopping carts are pushed along in front of the user.

Some people would benefit from a walling aid that does not require them to hunch over while advancing step-by-step or rolling along. Some people would benefit from the use of a walking aid that does not encircle them to any degree. Some people would benefit from a walking aid that does not carry the invalid stigma of a conventional walker. Some people would benefit from a walking aid that functions as a personal shopping cart, without dragging a cart behind them. Some people would benefit from walking aid equipped with a seat without obstructing its other functions.

It is an object of the invention to provide a walking aid that does not require the user to hunch over it use. It is an object of the invention to provide a walking aid that does not encircle the user to any degree. It is an object of the invention to provide a walking aid that does not carry the invalid stigma of a conventional walker. It is an object of the invention to provide a walking aid that functions as a personal shopping cart, but is pushed ahead of the user rather than dragged behind the user. It is an object of the invention to provide a walking aid that equipped with a seat which does not obstruct the other functions of the walking aid.

These and other objects and advantages of the invention will be seen and described below.

SUMMARY OF THE INVENTION

The present invention provides a walking aid that does not require the user to hunch over it in use.

The present invention provides a walking aid that does not encircle the user to any degree.

The present invention provides a walking aid that does not carry the invalid stigma of a conventional walker.

The present invention provides a walking aid that functions as a personal shopping cart, but is pushed ahead of the user rather than dragged behind the user.

The present invention provides a walking aid that equipped with a seat which does not obstruct the other functions of the walking aid.

The present invention also provides a light-duty walking aid for the benefit of persons who do not require side-to-side balance control and who do not need the weight support provided by the handle bars of wheeled walkers or by the side frames of non-wheeled walkers.

DETAILED DESCRIPTION OF THE INVENTION

Referring to FIG. 1 through FIG. 4, a wired short-nosed walking aid of the present invention is designated by the general reference number 10. The walking aid 10 has a tubular base frame 12 having a substantially square horizontal profile. The tubular base frame 12 has a front frame member 14 opposite and substantially parallel to a rear frame member 16. The tubular base frame 12 has a right frame member 18 opposite and substantially parallel to a left frame member 20. The front frame member 14, rear frame member 16, right frame member 18 and left frame member 20 could be separate components attached to members at the corners of the tubular base frame 12, or as shown, be segments of a continuous tubular base frame 12.

Inset within the tubular base frame 12, and spanning the right frame member 18 and left frame member 20, is a lattice or grid or wired grid 22. The wired grid 22 has three substantially parallel cross bars that bridge the right frame member 18 and left frame member 20, namely a front grid member 24, a center grid member 26 and a rear grid member 28. Each of the front grid member 24, center grid member 26 and rear grid member 28 lie between the front frame member 14 and the rear frame member 16, and are positioned substantially parallel to the front frame member 14 and the rear frame member 16.

Mounted to and below the front grid member 24 are a pair of small spaced-apart casters or swiveling front wheels 30, which are conventional swivel wheels for steering ease. Mounted to the rear frame member 16 is a rear wheel assembly 32 having a pair of larger spaced-apart rear wheels 34 and wheel-holding mounts 36. The rear wheels 34 are, as shown, mounted in conventional fashion so that they are centered behind the rear frame member 16, spaced inwardly of the right frame member 18 and left frame member 20, and standing higher than the rear frame member 16. The forward sections of each of the rear wheels 34 overlap the tubular base frame 12, extending below the rear frame member 16.

Seated on, and mounted to, the right frame member 18 and left frame member 20 is a pair of rear uprights 38. As shown, the rear uprights 38 are each mounted at the rear frame member 16, forward of the most forward extent of the rear wheels 34. Also mounted on the right frame member 18 and left frame member 20 is a single-piece framework surround 40. The framework surround 40 can be described as starting with a left connection member 42 mounted on, and affixed to, the left frame member 20, running to a left front upright 44, then running to left side arm 46, then running to hand grip 48 which substantially parallels the rear frame member 16, continuing back forward as a right side arm 50, then running down as a right front upright 52 and terminating as a right connection member 54.

Optionally, a pad or padding, such as rubber or cushioned pads, cover at least part of the components which are, or might be, gripped by hand, such as on the left side arm 46, and on the hand grip 48 and on the right side arm 50. Such padding would be for the comfort of the user.

While the walking aid 10 is chiefly for light-duty walking assistance (a) that does not encircle the user to any degree, (b) that does not carry the invalid stigma of a conventional walker, (c) that functions as a personal shopping cart, but is pushed ahead of the user rather than dragged behind the user, and (d) that does not require the user to hunch over it in use, as shown and in preferred embodiments the hand grip 48 is flanked by the substantially horizontal side arms 46, 50. The side arms 46, 50 in light-duty use function only to bridge the hand grip 48 to the framework of the walking aid 10. The side arms 46, 50 are nonetheless available to the user as sections that can be gripped while standing or propelling the walking aid 10 forward, and they can bear more weight without tipping the walking aid 10 because the side arms 46, 50 are closer to the center of gravity of the walking aid 10. In other words, there will be less of a lever effect when weight is placed on the side arms 46, 50 than on the hand grip 48.

In addition, the side arms 46, 50 not only bridge the hand grip 48 to the framework of the walking aid 10, this entire section of the walking aid 10 may be used to lean upon, with or without gripping any part of the walking aid 10, and similar to the description above, the walking aid 10 of the present invention in preferred embodiments is sufficient rigid and sufficiently heavy and/or has its weight sufficiently distributed, so that the user can lean upon the walking aid 10 from the rear without tipping the walking aid. Usually although not necessarily the user will lean on the side arms 46, 50 and/or the hand grip 48. Therefore the user can rest his or her body without bothering to be seated, and the user can support his or her body without gripping the walker 10, which is particularly advantageous for a user with tire hands or a user with some hand incapacity, such as a user suffering from arthritis.

The spaced-apart left front upright 44 and right front upright 52 each substantially parallel each other and the rear uprights 38. The left and right front uprights 44, 52 and rear uprights 38 form the upright corners of the basket body 56 of the walking aid 10. As shown, the left and right front uprights 44, 52 are mounted on the tubular base frame 12 not only inward of the front frame member 14 but also inward of the front grid member 24. Therefore while the basket body 56 spans the tubular base frame 12 from side to side, it is inset from both the front and the rear of the tubular base frame 12. The basket body 56 is also approximately set-in from the wheels.

The walking aid 10 also includes three upright wired panels, namely a right wired panel 58, a rear wired panel 60 and a left wired panel 62. The right wired panel 58 spans, and is mounted to, the right front upright 52 and the rear upright 38 behind it (right-side rear upright 38). The left wired panel 62 spans, and is mounted to, the left front upright 44 and the rear upright 38 behind it (left-side rear upright 38). Both the right wired panel 58 and left wired panel 62 are formed with a set of three side-by-side inverted U shaped rigid wires 64, each set rising from a side-panel bottom cross bar 66, and each set having a side-panel upper cross bar 68. The right wired panel 58 is spaced above the right frame member 18 and spaced below the right side arm 50. The left wired panel 62 is spaced above the left frame member 20 and spaced below the left side arm 46. The rear wired panel 60 is formed with a plurality of vertical wire bars 70 and vertical wire bars 72 connected at their intersections and connected to the rear grid member 28 at the lower edge and to the left side arm 46 and the right side arm 50 at the upper edge.

As seen in the drawings, and as described above, the basket body 56 more resembles an open-fronted personal shopping cart as to size and shape than a retail shopping basket which conventionally has a long, or long-nosed, basket.

The walking aid 10 in embodiments further includes a pivotally-mounted wired shelf 76 having a pronged edge member 78. The pivotally-mounted wired shelf 76 is pivotally mounted to the rear uprights 38 and can be stored flat against the rear wired panel 60 with its pronged edge member 78 meshing or mating with the rear wired panel 60 to releasably hold the pivotally-mounted wired shelf 76 against the rear wired panel 60. The pivotally-mounted wired shelf 76 pivots or swings out from the rear wired panel 60 to a position short of horizontal (about 3 to 8 degrees from horizontal) and is stopped at such position by a cross bar (not shown) spanning and mounted to left front upright 44 and the right front upright 52. This pivotally-mounted wired shelf 76 provides a convenient shelf for parcels which, because of its inward tilt and its edge member 78, will prevent parcels from sliding out the front end of the basket body 56. The pivotally-mounted wired shelf 76 can be swung up, out of the way, when larger parcels are loaded into the basket body 56.

Figure 1:
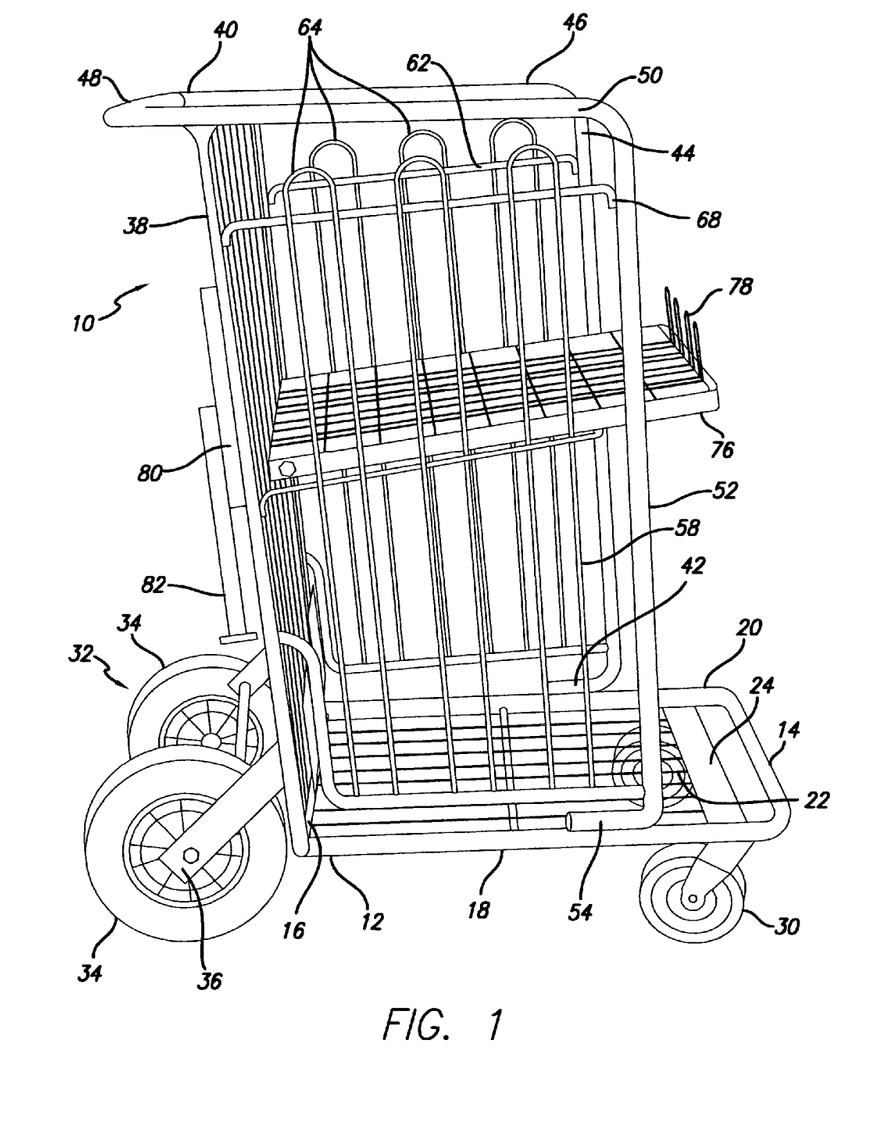
FIG. 1 is a sidewise perspective view of a wired short-nosed walking aid of the present invention.
Figure 2:
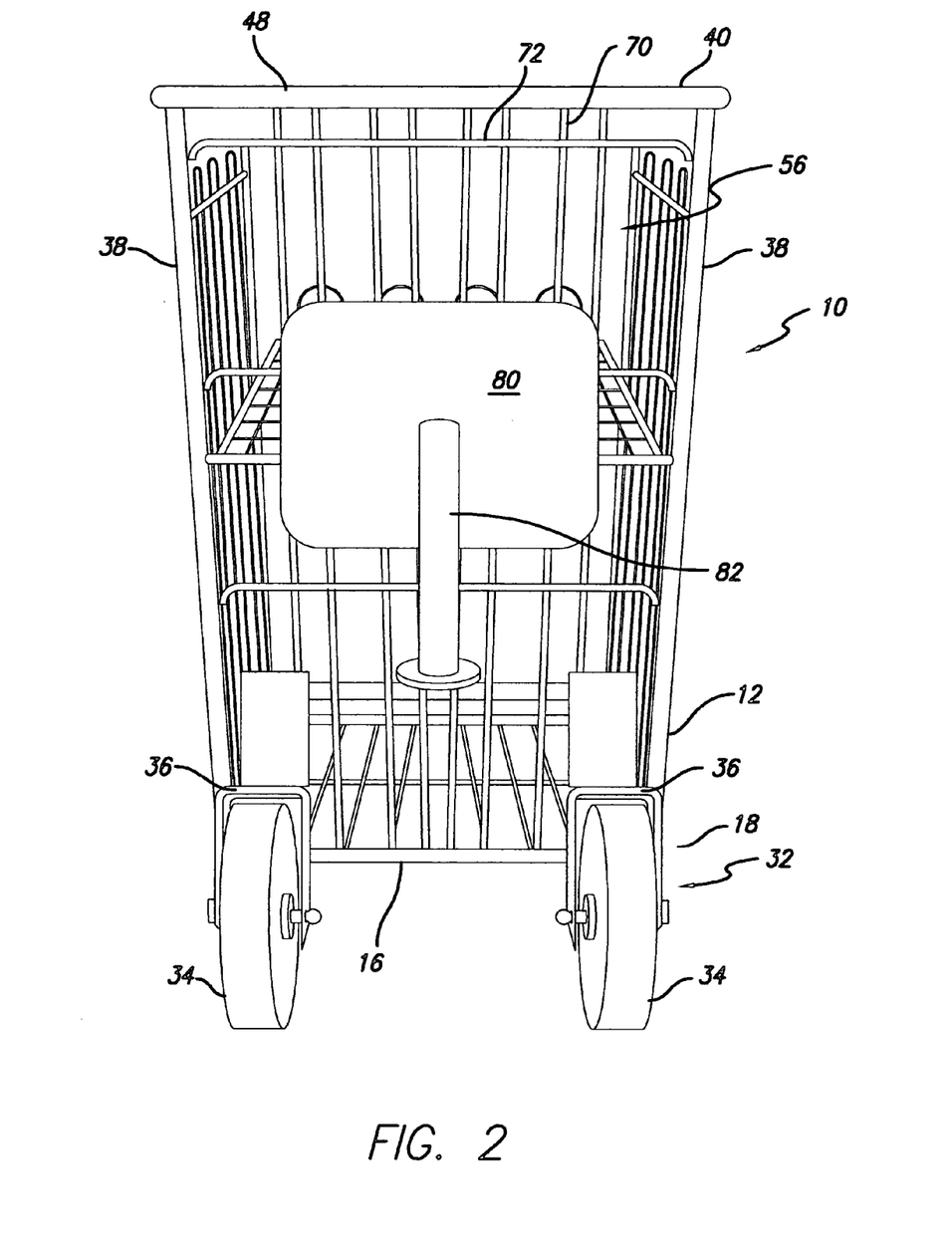
FIG. 2 is a rear view of the wired short-nosed walking aid of FIG. 1.
Figure 3:
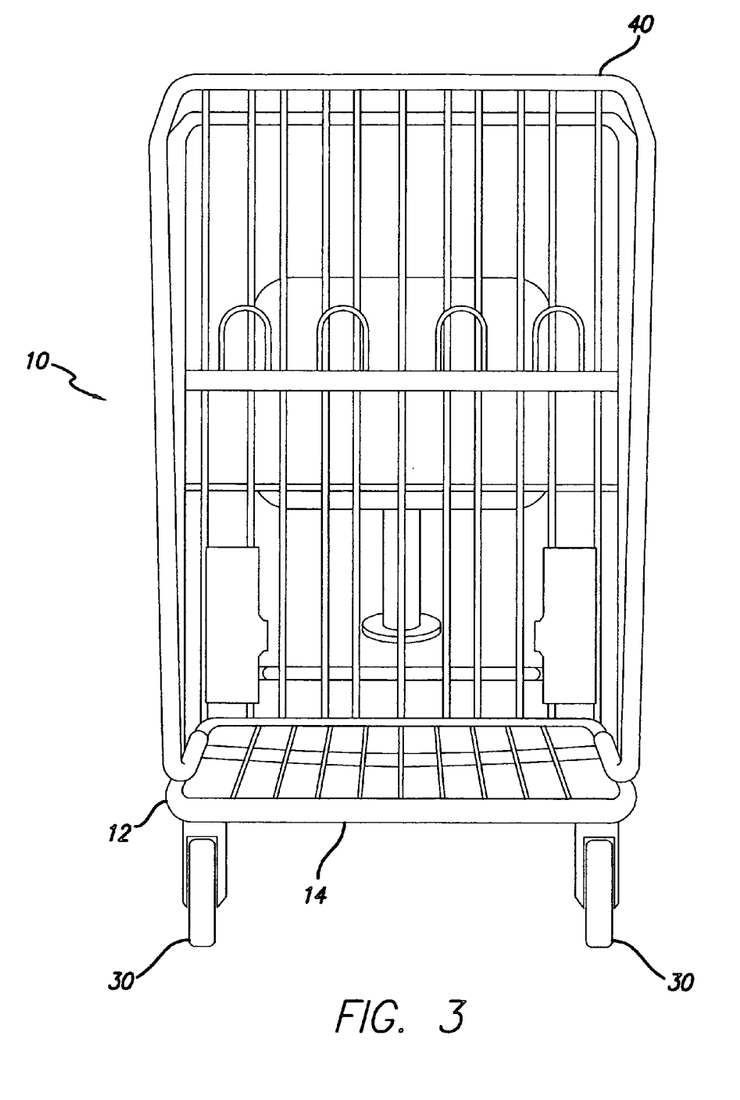
FIG. 3 is a front view of the wired short-nosed walking aid of FIG. 1.
Figure 4:
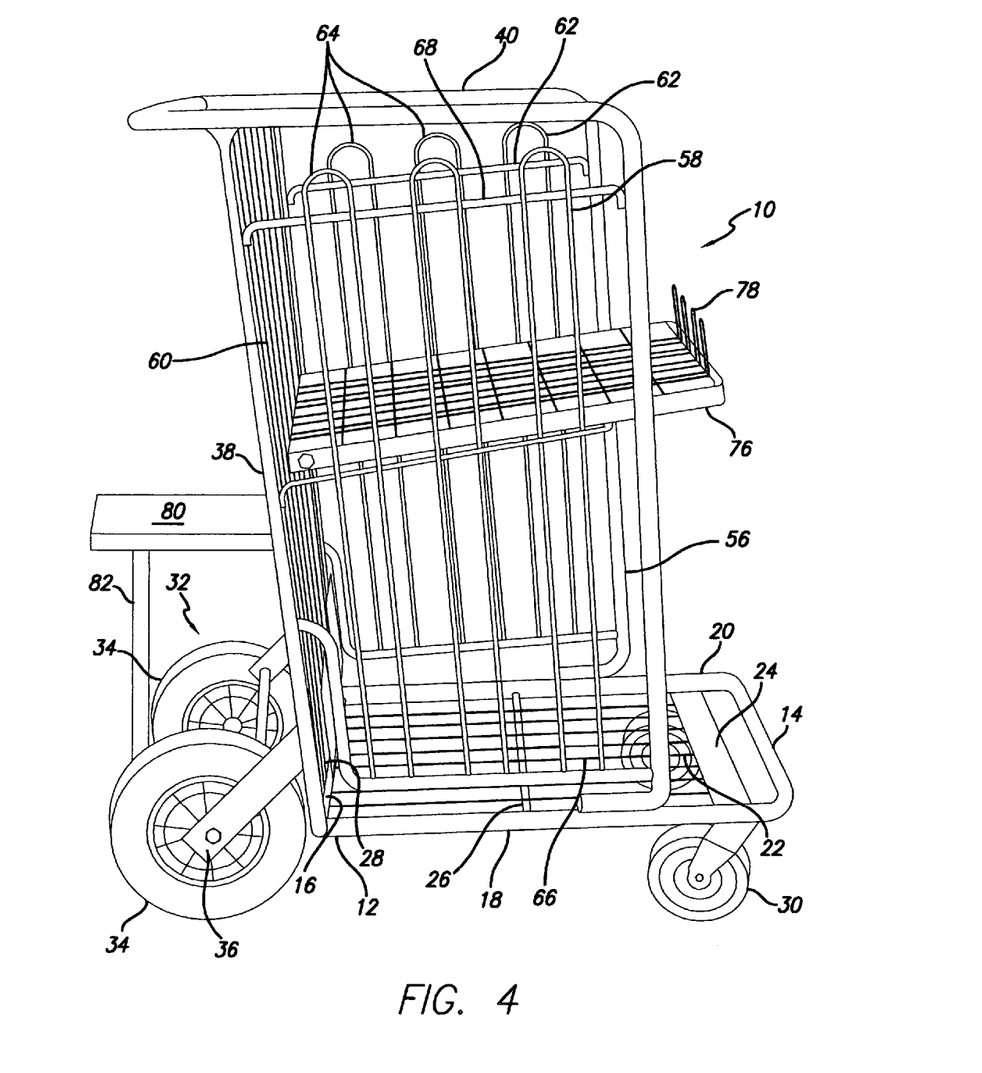
FIG. 4 is a sidewise perspective view of the wired short-nosed walking aid of FIG. 1 with the seat positioned in its use mode.

Pivotally mounted to the rear wired panel 60 is a seat member 80 a footed support or leg member 82 pivotally mounted to its underside (underside when extended horizontally). The seat member 80 and its leg member 82 fold up against the rear wired panel 60 when not in use, as shown in FIG. 1, FIG. 2 and FIG. 3, and swing out when the user wants to be seated, as shown in FIG. 4. The seat member 80 may of course be slightly padded for the comfort of the user.

The various components of the walking aid 10, including both the tubular or rod components, are sufficiently rigid and can be fabricated of conventional shopping cart materials, such as aluminum or nickel coated aluminum tubes and rods connected in conventional ways such as welding, or instead they can be fabricated from a conventional high-strength plastic or a carbon composite. Moreover, in broad embodiments of this invention, the panels, such as the wired panels 58, 60, 62, can be fabricated instead as solid panels.

Further, although the open-fronted basket body 56 is convenient for placing and removing parcels, and an additional front panel on a basket body would increase the overall weight of the walking aid 10 with little impact on utility, nothing herein excludes a fully enclosed basket body.

The present invention provides a wheeled walking aid comprising (a) a substantially horizontal base member having a front perimeter, a rear perimeter, a right perimeter and a left perimeter; (b) a front wheel assembly mounted to and supporting the base member adjacent the front perimeter, (c) a rear wheel assembly mounted to and supporting the base member adjacent the rear perimeter, (d) at least three upright right panels mounted on the base member, (e) a hand grip spaced behind and substantially parallel to the upright rear panel having a ground height (height off the ground, measured from the plane on which the wheels rest) of from about thirty to about forty inches, and (f) a seat assembly mounted to the exterior side of the rear panel, the seat assembly including a seat member translatable from a substantially vertical posture substantially parallel to the rear panel to a substantially horizontal posture substantially normal to the rear panel.

In preferred embodiments, the base member includes a base frame having a front frame member spaced apart from and substantially parallel to a rear frame member and a right frame member spaced apart from and substantially parallel to a left frame member. The base frame forms the perimeter of the base member, the front wheel assembly is mounted below and behind the front frame member, and the rear wheel assembly is mounted behind and to the rear frame member. In further preferred embodiments, the right upright panel is mounted on the right frame member, the left upright panel is mounted on the left frame member, and the rear upright panel bridges the right frame member and the left frame member and positioned forward of the rear frame member.

In further preferred embodiments, the base member includes a base frame having a front frame member spaced apart from and substantially parallel to a rear frame member and a right frame member spaced apart from and substantially parallel to a left frame member, and a grid bridging the right frame member and the left rear member.

In other preferred embodiments, the upright right panel, the upright rear panel and the upright left panel circumscribe an upright basket body, and the upright basket body having a substantially square horizontal profile. In further preferred embodiments, the upright basket body is from about 14 to about 20 inches wide and separately is from about 14 to about 20 inches deep. In other words, the walking aid is a short-nosed walker, projecting forward from the rear hand grip not much farther than the deepness of the upright basket, or in other words, from about 16 to about 22 inches from the hand grip. In other preferred embodiments, the ground height of the hand grip is from about thirty-two to about thirty-six inches, and in other words is sufficiently low to provide some support to the user (that is, the user is not reaching up to the hand grip) while being sufficiently high that the user does not need to hunch over it when held.

In other preferred embodiments, the hand grip is bridged to the walking aid body by a pair of substantially horizontally-disposed side arms which can be used as alternative hand grips.

In other preferred embodiments the present invention is a wheeled walking aid comprising (a) an upright basket body of a substantially square horizontal profile having a plurality of sides mounted on a wheeled base, (b) a hand grip positioned spaced apart from and behind the basket body by a pair of support arms, the hand grip having a ground height of from about thirty-two to about thirty-six inches, (c) a seat assembly mounted on the basket body and the seat assembly including a seat member translatable from a substantially upright posture to a substantially horizontal posture substantially normal to the basket body. the wheeled walking aid in further preferred embodiments includes a seat assembly with a support leg hingedly connected to the seat member and translatable to a support posture.

The Method

Figure 5:
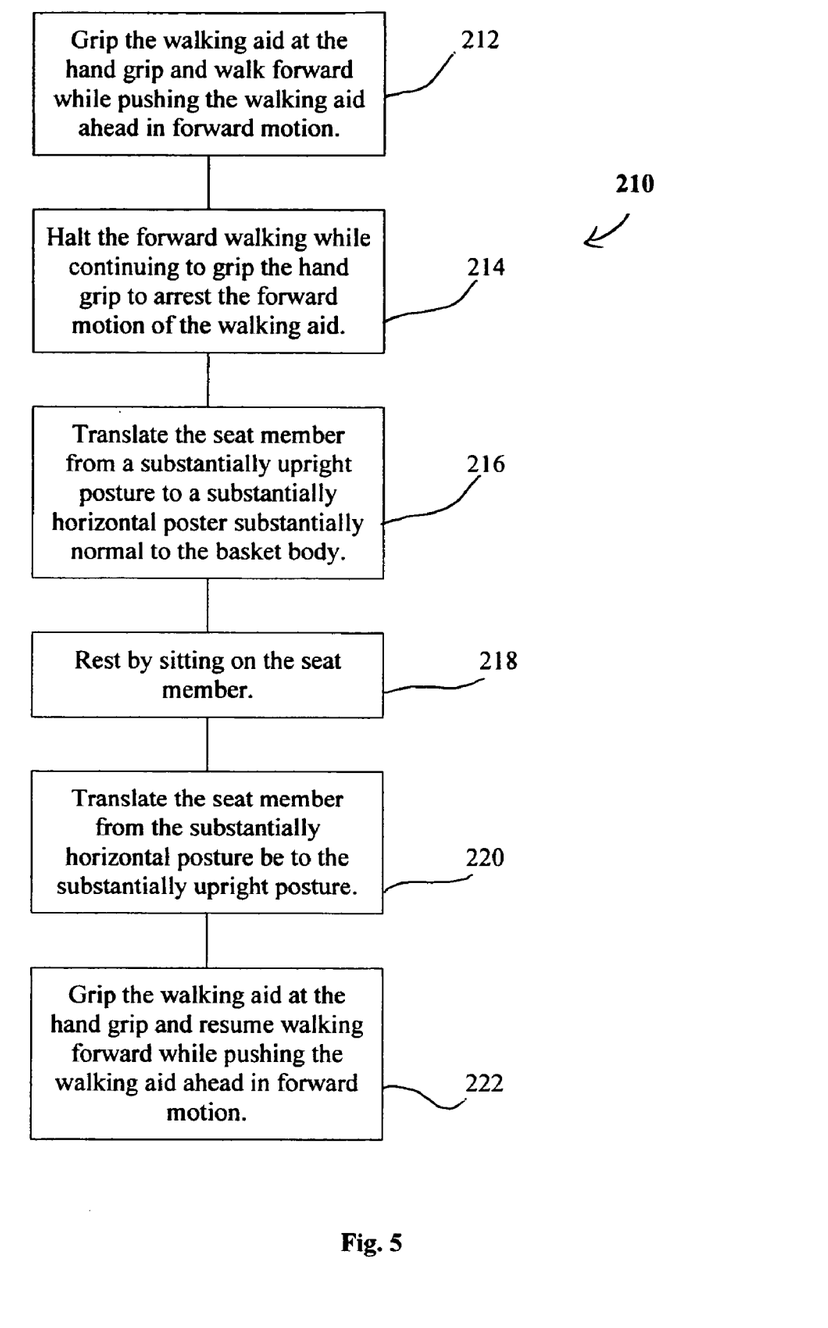
FIG. 5 is a flow diagram of the method of the invention.

Referring now also to FIG. 5, the present invention also provides a method 210 of assisting the ambulation of a person. The method employ a wheeled walking aid of the invention, namely one having an upright basket body of a substantially square horizontal profile having a plurality of sides mounted on a wheeled base, a hand grip positioned spaced apart from and behind the basket body by a pair of support arms, the hand grip having a ground height of from about thirty-two to about thirty-six inches and a seat assembly mounted on the basket body, as in the embodiments described above. The seat assembly includes a seat member translatable from a substantially upright posture to a substantially horizontal posture substantially normal to the basket body, as in the embodiments described above. The method comprises a plurality of steps. Step 212 is, with the seat assembly in the upright posture, grasping or gripping the walking aid at the hand grip and walking forward while pushing the walking aid ahead in forward motion. Step 214 is then halting the forward walking while continuing to grasp or grip the hand grip to arrest the forward motion of the walking aid. In other words, when the user stops walking but continues to hold the walking aid, the forward motion of the walking aid is arrested. Step 216 is then translating the seat member from the substantially upright posture to the substantially horizontal posture substantially normal to the basket body. Step 218 is then resting by sitting on the seat member. Step 220 is then translating the seat member from the substantially horizontal posture back to the substantially upright posture. Step 220 is then grasping or gripping the walking aid at the hand grip and walking forward again while pushing the walking aid ahead in forward motion.

An optional or additional step of the method, which upon disclosure here is of sufficient clarity that it does not require inclusion on the flow diagram, is leaning upon the walker to rest without being seated. This optional step can be interjected between the illustrated steps of the method, for instance prior to step 216.

Nothing herein excludes the inclusion of obvious expedients, measures, conveniences and fitting, including without limitation, casters or castering wheels on the front and rear wheels, a padded seat member, an adjustable-height hand-grip, multiple shelves within the basket body, webbed or other flexible package holder within the basket body, stand-still stop mechanism or brake, and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A wheeled walking aid comprising:
   a substantially horizontal base member having a front perimeter, a rear perimeter, a right perimeter and a left perimeter;

a front wheel assembly mounted to and supporting said base member adjacent said front perimeter;

a rear wheel assembly mounted to and supporting said base member adjacent said rear perimeter;

an upright right panel mounted on said base member adjacent said right perimeter;

an upright rear panel having an interior side and an exterior said mounted on said base member adjacent said rear perimeter;

an upright left panel mounted on said base member adjacent said left perimeter;

a hand grip spaced behind and substantially parallel to said upright rear panel having a ground height of from about thirty to about forty inches;

a pair of spaced-apart substantially horizontally-disposed side arms, said hand grip bridging said pair of side arms; and a seat assembly mounted to said exterior side of said rear panel, said seat assembly including a seat member translatable from a substantially vertical posture substantially parallel to said rear panel to a substantially horizontal posture substantially normal to said rear panel, said base member, said upright right panel, said upright rear panel, said upright left panel, said hand grip and said pair of side arms being sufficiently rigid and sufficiently heavy to bear the weight of a user leaning on said hand grip and pair of side arms.

2. A wheeled walking aid according to claim 1 wherein said base member includes a base frame having a front frame member spaced apart from and substantially parallel to a rear frame member and a right frame member spaced apart from and substantially parallel to a left frame member, and said base frame forming the perimeter of said base member, said front wheel assembly mounted below and behind said front frame member, and said rear wheel assembly mounted behind and to said rear frame member.

3. A wheeled walking aid according to claim 1 wherein said base member includes a base frame having a front frame member spaced apart from and substantially parallel to a rear frame member and a right frame member spaced apart from and substantially parallel to a left frame member, and said right upright panel mounted on said right frame member, said left upright panel mounted on said left frame member, and said rear upright panel bridging said right frame member and said left frame member and positioned forward of said rear frame member.

4. A wheeled walking aid according to claim 1 wherein said base member includes a base frame having a front frame member spaced apart from and substantially parallel to a rear frame member and a right frame member spaced apart from and substantially parallel to a left frame member, and a grid bridging said right frame member and said left rear member.

5. A wheeled walking aid according to claim 1 wherein said upright right panel, said upright rear panel and said upright left panel circumscribe an upright basket body, and said upright basket body having a substantially square horizontal profile.

6. A wheeled walking aid according to claim 1 wherein said ground height of said hand grip is from about thirty-two to about thirty-six inches.

7. A method of assisting the ambulation of a person, said method employing a wheeled walking aid having an upright basket body of a substantially square horizontal profile having a plurality of sides mounted on a wheeled base, a hand grip positioned spaced apart from and behind said basket body by a pair of spaced-apart substantially horizontally disposed side arms, said hand grip bridging said side arms and having a ground height of from about thirty-two to about thirty-six inches and a seat assembly mounted on said basket body, said seat assembly including a seat member translatable from a substantially upright posture to a substantially horizontal posture substantially normal to said basket body, said walking aid being sufficiently rigid and sufficiently heavy to bear the weight of a user leaning on said said hand grip and pair of side arms, comprising the steps of:

with said seat assembly in said upright posture, gripping said walking aid at said hand grip and walking forward while pushing said walking aid ahead in forward motion;

halting said forward walking while continuing to grasp said hand grip to arrest the forward motion of said walking aid; and resting by leaning on said hand grip and said side arms; and separately resting by the steps of translating said seat member from said substantially upright posture to said substantially horizontal posture substantially normal to said basket body;

then sitting on said seat member; and then translating said seat member from said substantially horizontal posture back to said substantially upright posture, and grasping said walking aid at said hand grip with said two hands and walking forward while pushing said walking aid ahead in forward motion.

8. A method of assisting the ambulation of a person according to claim 7, wherein said step of resting by leaning on said hand grip and said side arms is performed without gripping said hand grip or said side arms.

* * * * *